3,393,081
HEAT SEALABLE MOISTURE BARRIER COATINGS
FOR POLYSTYRENE ARTICLES
Lewis F. Bogle, Enfield, Conn., assignor to Monsanto
Company, a corporation of Delaware
No Drawing. Continuation of application Ser. No.
288,919, June 19, 1963. This application Dec. 6,
1966, Ser. No. 599,643
8 Claims. (Cl. 106—267)

ABSTRACT OF THE DISCLOSURE

A heat sealable, non-blocking, barrier coating for polystyrene, comprising a saturated fatty acid either alone or in combination with other fatty materials.

---

This application is a continuation of application Ser. No. 288,919, filed June 19, 1963, now abandoned.

This invention relates to plastic polyolefin articles having improved heat sealing and moisture barrier characteristics. The invention relates more particularly to coating compositions that are heat sealable and can be applied to polystyrene articles to reduce their permeability to water vapor, without adversely affecting the desirable characteristics of polystyrene such as its clarity and freedom from blocking. The invention relates especially to biaxially oriented polystyrene sheet or film possessing improved moisture barrier properties and capable of heat sealing at temperatures low enough to avoid disorientation of the oriented plastic and yet sufficiently heat insensitive to allow storage at temperatures up to about 40° C., and preferably up to about 50° C. without blocking.

Polystyrene articles in various shapes and forms, including especially biaxially oriented polystyrene film and sheet, have many uses in the packaging field. Polystyrene would, however, have many more uses if it were moistureproof as well as more easily heat sealable.

A variety of coating materials have been heretofore proposed for the purpose of improving the moisture barrier properties of polystyrene but all of the materials proposed have resulted in products characterized by one or more serious disadvantages. For instance, some coating materials have been found to give good moisture barrier properties and result in seals of high strength but they have been too sticky to permit the coated polystyrene sheet to be rewound into rolls without blocking. Other materials have been deficient in bonding strength and still others, because of their relatively high melting point, require such high temperatures for heat sealing that the orientation of the polystyrene film is destroyed in the process. Still other materials are effective as moisture barriers only when applied in relatively great thicknesses, and consequently impair the clarity of the film.

It is a principal object of this invention to make polystyrene film more moisture-proof as well as readily heat sealable without blocking at normal temperatures. A more particular object is to provide biaxially oriented polystyrene film of improved moisture barrier properties and capable of heat sealing at a temperature below that at which destruction of orientation occurs. Further objects are to provide coatings for polystyrene which are glossy, clear, non-blocking, non-tacky and give good adhesion and bonding after heat sealing. These and other objects, as well as the scope, operation and utility of the invention will become more clearly apparent from the following description.

Broadly speaking, the present invention is based on the discovery that aliphatic saturated monocarboxylic fatty acids of the structural formula $$CH_3(CH_2)_nCOOH$$

where $n$ is an integer in the range of from 8 to 20, provide a surprisingly effective improvement in the moisture barrier properties of polystyrene and at the same time suitably improve its heat sealing characteristics when applied as a coating to the surface thereof. Particularly effective are the acids having an even number of carbon atoms in the range between 16 and 20 (i.e., $n$ equals 14 to 18). Moreover, in the case of the higher melting acids it has been found that an improved result is obtained by using palmitic ($C_{16}$), arachidic ($C_{20}$), or behenic ($C_{22}$) acid in a mixture with at least 5% of a lower ($C_8$ to $C_{14}$) acid, such as myristic or caprylic acid, since such lower melting acids have been found to make the resulting coating heat sealable at a desirably lower temperature and at the same time preclude crystallization of the higher acid which can otherwise ultimately result in a reduction in clarity of the product.

Odd numbered saturated fatty acids, particularly those containing 15 to 21 carbon atoms per molecule, e.g., pentadecanoic, or heptadecanoic acid, also give satisfactory results though the even numbered acids are generally more economical to use and are therefore preferred.

The saturated fatty alcohols having 12 to 18 or 22 carbon atoms per molecule, e.g., lauryl or stearyl alcohol, have been found to have a similar effect though the alcohol coatings have somewhat poorer smear resistance than the acid coating. Alcohols lower than stearyl have too low a melting point to be suitable by themselves but fatty alcohols having 12 carbon atoms (lauryl) or more can be formulated into effective coatings when mixed with a sufficient amount of a higher melting fatty material such as stearic acid to produce a mixture having a melting point of at least about 48° C., necessary to avoid blocking when the coated polystyrene sheet is to be wound into rolls.

Saturated fatty ethers having 32 to 36 carbon atoms per molecule, derived from the appropriate fatty alcohols, also give good vapor barrier properties and can be used with advantage in coatings for polystyrene film. Where, as in the case of dioctadecyl ether, the ether by itself is unable to dissolve polystyrene and give satisfactory heat sealing properties, good results can be obtained by blending it with a suitable fatty material such as myristic acid in a proportion sufficient to yield solubility in polystyrene at heat sealing temperature and pressure. For instance, mixtures comprising 5 to 50% dioctadecyl ether and correspondingly 95 to 50% myristic acid give good results.

It should be understood that the suitability of a particular composition as a heat seal in this invention is not primarily dependent on the melting point of the composition. For instance, oleic acid, a low melting unsaturated fatty acid, will not effectively heat seal polystyrene under heat and pressure, whereas relatively high melting materials such as palmitic acid or stearyl alcohol will. To provide an effective heat seal for polystyrene, the fatty material should be able to dissolve polystyrene when heat and pressure are momentarily applied thereto. Sufficient solubility of the polystyrene should be produced at a temperature not lower than 48° C. (to avoid blocking) but low enough to cause a heat seal without unmolding the oriented resin substrate. The seals obtained are essentially heat activated solvent seals using as the solvent a normally solid material having good barrier properties.

Thus, satisfactory coating compositions having a suitable solubility can likewise be formulated by blending a fatty material with good polystyrene solubility and a saturated or unsaturated fatty amide with no polystyrene solubility. For instance, fatty amides of about 6 to 18 carbon atoms per molecule, e.g., caproamide ($C_6$), lauramide ($C_{12}$) or stearamide ($C_{18}$) or an unsaturated fatty amide such as oleamide, constitute excellent water vapor barriers while simultaneously also acting as anti-blocking agents. In contrast to the amides, primary and secondary amines have proved to be relatively undesirable because they tend to have considerably poorer water barrier properties.

Hydroxylated fatty acids, such as 12-hydroxystearic acid, are not desirable materials for the purposes of this invention since the hydroxyl group apparently tends to raise the water permeability rate.

The invention is of particular interest in connection with biaxially oriented polystyrene sheet or film, i.e., with thin, flexible sheet material that has been stretched or cold drawn about 50 to 300% of its original length along its two principal axes so as to cause orientation and thereby increase both strength and clarity. Such polystyrene film typically may range in thickness from about 0.0005 to 0.1 inch. When both surfaces of the sheet material to be bonded are coated with the bonding composition, polystyrene film having a thickness in the range between about 0.001 and 0.002 inch is preferred but when a coated polystyrene surface is to be bonded to an uncoated one then it is preferred that the coated polystyrene film have a thickness between about 0.001 and 0.002 inch whereas the uncoated polystyrene film to be bonded thereto may be of any gauge from about 0.001 to 0.010 inch or more. While bonds may be obtained using base sheets having a thickness in excess of the values stated above, the resulting bond may tend to be brittle, making such seals less suitable for uses where a bending movement of this sealed bond is foreseeable or contemplated.

For purposes of this invention the fatty materials are applied to the polystyrene film from solution by any common coating technique such as rotogravure, trailing blade, air knife, metering bar, size press, etc. For this purpose the fatty material is dissolved in a suitable inert solvent, i.e., one that does not affect the resin base. For instance, alkanols having from 1 to about 4 carbon atoms are particularly useful for this purpose, secondary butyl alcohol and isopropyl alcohol being particularly preferred. However, aliphatic hydrocarbon solvents such as pentane, hexane and octane, etc. can be used similarly. In preparing a solution suitable for coating the desired fatty material or mixture of fatty materials is dissolved in the chosen solvent in a concentration between about 0.5 and about 5%, preferably 1 to 3%. The optimum coating for barrier properties is obtained for all the fatty materials when the maximum coating weight is applied without haze. A coating weight just under the point of visible haze is the best for barrier properties and film clarity, film clarity being a must for packaging material. Typically, for instance, the coating solution can be applied to the polystyrene base so as to leave a wet coating weight of about 3 to 20 milligrams per square inch of base surface, or about 0.03 to 0.20 milligram per square inch of dry coating material after evaporation of solvent. For maximum barrier effect it is of course desirable to apply the maximum coating weight that still yields a clear coating. However, increasing the coating weight may cause some loss in eventual seal strength. In any event, after the plastic sheet has been coated with the coating composition according to this invention and the solvent evaporated, the sheet can be rewound for shipment or storage prior to eventual use.

In heat sealing the coated sheet, its coated surface is mated with another sheet that may be coated or uncoated. Thereupon the mated surfaces are heated under pressure in an otherwise known manner to a temperature in excess of the melting point of the coating composition employed but not so high as to destroy the orientation of the plastic base. Generally the heat sealing of polystyrene is effected in the temperature range between about 50° and 150° C., preferably between about 80° and 120° C.

The following examples are given to further illustrate the nature and advantages of the present invention.

Example I

Coating compositions were prepared by dissolving a fatty acid, or a mixture of fatty acids, in secondary butyl alcohol as shown in Table I below.

The solutions were prepared by adding the acid or acids in powder or flake form to the solvent and stirring and heating at a temperature of about 60° C. until a clear solution was obtained. The resulting solution was then allowed to cool to room temperature (about 20° to 25° C.) and applied to one side of a sheet of "Polyflex" biaxially oriented polystyrene film of 0.001 inch thickness. The excess was removed manually using a No. 6 Mayer bar (wire wound metal rod familiar to the coating trade). In each instance the wet coating weight applied to the plastic film was constant resulting in a dry coating weight proportional to the wet coating solids. The coated films were dried by placing them for 5 to 10 seconds in a circulating air oven maintained at a temperature between about 85° and 95° C.

The coated film samples, 1 inch wide, were heat sealed by pressing their coated surface to an uncoated surface of a like film at approximately 110° C., using a hand iron sealer. In this operation, the coated film samples were in contact with the hot iron sealer for approximately one second. Though oriented polystyrene tends to unmold at temperatures of about 90° C. and higher, objectionable unmolding does not occur immediately. For instance, "Polyflex" oriented polystyrene can be kept at 110° C. for as long as three seconds without any noticeable unmolding occurring. Seal strengths were evaluated qualitatively and rated good or poor.

The coated films were visually inspected for clarity to determine whether the presence of the coating has caused any noticeable haziness, clarity being one of the principal desiderata in films intended for packaging. Except where the utility of a sample was obviously impaired due to haziness the samples were tested to determine their water vapor transmission rate, their blocking characteristics, etc.

The data obtained are summarized in Table I.

TABLE I.—POLYSTYRENE FILM COATED WITH FATTY ACIDS

| Sample No. | Coating Composition* Percent Solids in Sec. Butyl Alcohol | Slip | Clarity | Heat Seal | Blocking | W.V.T.R. gm./100 in.2/24 Hrs. |
|---|---|---|---|---|---|---|
| Control | | Good | Clear | None | None | 8.0 to 10.0 |
| 1 | 3.0 | do | Hazy | do | do | |
| 2 | 2.0 | do | Clear | do | do | 1.2 |
| 3 | 2.0 | do | do | Good | do | 5.0 |
| 4 | 3.0 | do | do | do | do | 2.6 |
| 5 | 4.0 | | Hazy | | | |
| 6 | 2.0 | Good | Clear | Good | None | 4.6 |
| 7 | 2.0 | do | Hazy | do | Blocked | 7.2 |
| 8 | 2.0 | do | do | do | None | 1.1 |
| 9 | 2 | do | Clear | do | do | 0.69 |
| 10 | 2 | do | do | Fair | do | 0.49 |
| 11 | 4 | do | do | Good | do | 0.62 |
| 12 | 4 | do | do | Fair | do | 0.36 |
| 13 | 4.5 | do | Hazy | | | |

*The compositions used in the several samples are further identified in Table I-A below

TABLE I-A.—COMPOSITION OF TABULATED SAMPLES

Control—Uncoated 0.001 "Polyflex" oriented polystyrene film.
1—Docosanoic acid, practical grade, Eastman Organic Chemicals.
2—Docosanoic acid, practical grade, Eastman Organic Chemicals.
3—50/50 mixture of docosanoic acid and myristic acid, "Neo-Fat-14."
4—50/50 mixture of docosanoic acid and myristic acid, "Neo-Fat-14."
5—50/50 mixture of docosanoic acid and myristic acid, "Neo-Fat-14."
6—Commercially pure myristic acid, Armour's "Neo-Fat-14" (90% $C_{14}$; 5% $C_{16}$; 5% $C_{12}$).
7—Tridecanoic acid.
8—Heptadecanoic acid.
9—Commercially pure palmitic acid, Armour's "Neo-Fat-16" (1% $C_{14}$; 0.5% $C_{15}$; 90% $C_{16}$; 1% $C_{17}$; 7.5% $C_{18}$).
10—Commercially pure stearic acid, Armour's "Neo-Fat-18" (7% $C_{16}$; 2.5% $C_{17}$; 90% $C_{18}$; 0.5% $C_{20}$).
11—Eutectic mixture of palmitic and stearic acids, Armour's "Neo-Fat-16-54" (2% $C_{14}$; 0.5% $C_{15}$; 66% $C_{16}$; 1.5% $C_{17}$; 30% $C_{18}$).
12—Hydrogenated tallow acid, Armour's "Neo-Fat-18-58" (4% $C_{14}$; 0.5% $C_{15}$; 29% $C_{16}$; 1.5% $C_{17}$; 64% $C_{18}$).
13—Hydrogenated tallow acid, Armour's "Neo-Fat-18-58" (4% $C_{14}$; 0.5% $C_{15}$; 29% $C_{16}$; 1.5% $C_{17}$; 64% $C_{18}$).

The data summarized in Table I show that the application of $C_{14}$ and higher fatty acids as coatings to polystyrene film results in a very substantial decrease in water vapor transmission rate of the film. While the pure docosanoic acid makes it difficult to heat seal the polystyrene film excellent sealing can be obtained by blending it with other fatty acids so as to change the solubility of the mixture. Thus, a good clear coating with improved water barrier properties and good heat seal characteristics can be obtained by blending the docosanoic acid with myristic acid as shown by sample Nos. 3 and 4. Only when the coating becomes too thick, as in sample No. 5, is the clarity of the film adversely affected.

A comparison of sample No. 1 with sample No. 4 shows that blending the higher acid with a lower acid inhibits crystallization. As a result although the pure acid in No. 1 could not be coated at 3% solids without crystal buildup and consequent haze, the blend can be applied at 3% solids without crystal buildup or haze. In sample No. 5 a hazy coating was obtained even though a blend water barrier properties, but here again the relatively less vapor resistant coating was somewhat easier to heat seal.

Sample Nos. 7 and 8 show that among the odd numbered acids the $C_{13}$ acid was too low melting to avoid blocking and at the same time resulted in only a relatively small improvement in water barrier properties. On the other hand, the $C_{17}$ acid produced excellent water barrier properties as well as a good heat seal without any blocking, but showed some haze at the coating weight used. This, of course, could be eliminated by applying a thinner coating.

Table I-B shows typical seal strength obtainable with the sealing compositions of this invention.

As before, the several coating compositions were hand coated on 1 mil "Polyflex" biaxially oriented polystyrene sheet using a No. 6 Mayer bar.

TABLE I-B.—SEAL STRENGTHS

| Coating Composition Acid Blend* | Total Solids in Sec. Butyl Alcohol, percent | Seal Strength, 240° F., 40 p.s.i., 2 Second Dwell Time, gms./inch |
| --- | --- | --- |
| Neo Fat 16-54 | 3 | 163 |
| Neo Fat 16-54 | 4 | 154 |
| Neo Fat 18-58 | 2.0 | 168 |
| Neo Fat 18-58 | 2.5 | 150 |

*For chemical compositions, see footnote to Table I, i.e., Table I-A.

The seals were made with a Sentinel Bar type heat sealer wherein two sheets can be heat sealed between two jaws at preselected pressure and temperature. The device used had a top jaw which was made of metal and was heated, and a bottom jaw made of rubber.

When a seal was made (coated surface to uncoated surface) heat seal strength was evaluated on a standard Instron tensile tester using a crosshead travel rate of 12 inches per minute and a chart speed of 2 inches per minute. The heat seal strength was measured as the static force necessary to start the bond peeling.

It can be seen that all four samples had very high seal strength. It can also be seen that with a given coating composition the seal strength drops somewhat as coating weight is increased.

Example II

In Example II stearyl alcohol, a representative saturated fatty alcohol, and dioctadecyl ether, a typical fatty ether, were evaluated as water barrier coatings employing the same procedures as described in Example I. The results with the fatty alcohol are summarized in Table II, and those with the fatty ether are summarized in Table III.

These results show that saturated fatty alcohols are

TABLE II.—POLYSTYRENE FILM COATED WITH SATURATED FATTY ALCOHOL COMPOSITIONS

| Sample No. | Percent Composition | | | Coated Film Properties | | | | | |
| --- | --- | --- | --- | --- | --- | --- | --- | --- | --- |
| | Stearyl Alcohol | Stearic Acid | Sec. Butyl Alcohol | Slip | Clarity | Heat Seal | Blocking | Smear Resistance | W.V.T.R. gm./100 in 2/24 hrs. |
| 14 | 2.0 | | 98 | Fair | Clear | Good | None | Poor | 1.31 |
| 15 | 2.0 | 2.0 | 96 | Good | do | do | do | Good | 1.96 |
| 16 | 1.0 | 3.0 | 96 | do | Hazy | | | | |
| 17 | 0.5 | 1.5 | 98 | do | do | | | | |
| 18 | 0.25 | 0.75 | 99 | do | Clear | Good | None | Good | 6.45 | was used, but here the haze was due to excessive coating weight, not crystals.

The palmitic-stearic acid blend (coating No. 11) and the hydrogenated tallow acid (coating No. 12) gave particularly good water barrier properties, giving a clear coating even when applied at 4% solids. Of these two coatings, the palmitic-stearic acid mixture was the easier to heat seal, though slightly inferior to the tallow acid in resistance to vapor transmission. The palmitic and stearic acids individually (Nos. 9 and 10) likewise gave good also effective as water barrier coatings. The fatty alcohols give more readily heat sealable coatings than the fatty acids. But in comparison with the latter, tend to smear somewhat more readily. Of course, if this is objectionable it can be corrected by blending the fatty alcohol with a fatty acid such as stearic acid. As can be seen by comparing the clarity of sample No. 15 with Nos. 16 and 17 the fatty alcohol is most compatible with stearic acid when mixed with at least an equal amount of the latter. Blends having approximately equal proportions of fatty acid and fatty alcohol are therefore preferred where film clarity as well as high impermeability are important. While sample No. 18 shows that a clear coating can be obtained even from blends containing one part of stearyl alcohol per three parts of stearic acid if the coating weight is made light enough, the barrier properties of such a light weight coating naturally are not so good as the properties of the heavier coatings represented by sample Nos. 14 and 15. However, the blend coating No. 18 was considerably easier to heat seal than the pure stearic acid coating No. 10 (Table I).

Table III shows results obtained with coating compositions based on saturated fatty ethers.

TABLE III.—POLYSTYRENE FILM COATED WITH FATTY ETHER COMPOSITIONS

| Sample No. | Percent Composition | | | Coated Film Properties | | | | |
|---|---|---|---|---|---|---|---|---|
| | Dioctadecyl Ether | Myristic Acid | Heptane | Slip | Clarity | Heat Seal | Blocking | W.V.T.R. gm./100 in 2/24 hrs. |
| 14 | 3.0 | | 97.0 | Fair | Clear | None | None | 0.40 |
| 15 | 4.0 | | 96.0 | do | Hazy | do | do | 1.10 |
| 16 | 2.0 | 3.0 | 95.0 | Good | Clear | Good | do | 2.05 |

It is apparent that saturated fatty ethers have outstanding water barrier properties. If the ether, such as pure dioctadecyl ether, has inadequate solubility for polystyrene to be readily heat sealable, this disadvantage can be readily corrected by blending it with a suitable amount of another fatty material with good polystryene solubility such as myristic acid.

The coated polystyrene articles of this invention are suitable for a variety of applications which require a transparent, heat sealable, relatively moisture-proof, impermeable plastic. Because of their non-toxic nature, the polystyrene sheets or films made according to the present invention are particularly useful for packaging foods such as bread.

It should be understood that proportions of materials have been expressed throughout this application on a weight basis unless otherwise indicated.

Having described the general nature of the invention and illustrated it by various specific examples, it will be apparent to those skilled in the art that variations and modifications thereof may be made therein without departing from the spirit thereof or from the scope of the appended claims.

What is claimed is:

1. A biaxially oriented polystyrene plastic sheet having at least one surface thereof coated with a thin, clear, adherent film of fatty material, consisting essentially of a mixture of at least one aliphatic, saturated, monocarboxylic fatty acid having the structural formula $$CH_3(CH_2)_nCOOH$$

where $n$ is an integer in the range of from 8 to 20, plus at least one compound selected from the group consisting of saturated fatty alcohols having 12 to 22 carbon atoms per molecule, saturated fatty ethers having 32 to 36 carbon atoms per molecule, and saturated and unsaturated fatty amides having 6 to 18 carbon atoms per molecule, said mixture having an adequate solubility for heat sealing polystyrene at a temperature below about 150° C.

2. A coated sheet according to claim 1 wherein the adherent film of fatty material consists essentially of a mixture of a saturated fatty acid amide having 6 to 18 carbon atoms per molecule, and an aliphatic, saturated, monocarboxylic fatty acid where $n$ equals 14 to 18 and is an even integer.

3. A coated sheet according to claim 1 wherein the adherent layer consists essentially of a mixture of dioctadecyl ether and myristic acid.

4. A coated sheet according to claim 1 wherein the adherent layer consists essentially of stearyl alcohol and stearic acid.

5. A liquid coating composition for polystyrene which consists of a solution of about 0.5 to 5% by weight of at least one aliphatic, saturated, monocarboxylic fatty acid having the structural formula $$CH_3(CH_2)_nCOOH$$

where $n$ is an integer in the range of from 8 to 20, and about 0.2 to 3% by weight of at least one other fatty material selected from the group consisting of saturated fatty alcohols having 12 to 22 carbon atoms per molecule, saturated fatty ethers having 32 to 36 carbon atoms per molecule, and saturated and unsaturated fatty amides of about 6 to 18 carbon atoms per molecule, dissolved in 92 to 99.3% by weight of a normally liquid, volatile, aliphatic solvent which is inert to polystyrene.

6. A coating composition according to claim 5 wherein the fatty acid is present in the composition in a proportion such that a dry composition of the fatty acid having adequate solubility for heat sealing polystyrene between about 80°–120° C. is produced on evaporation of the solvent.

7. A coating composition according to claim 5 wherein the solvent is an alkanol of 1 to 4 carbon atoms.

8. A coating composition according to claim 5 wherein the solvent is a paraffin hydrocarbon of 5 to 8 carbon atoms.

References Cited

UNITED STATES PATENTS

| 2,011,348 | 8/1935 | Slack et al. | 117—167 |
| 2,206,046 | 7/1940 | Pollard | 106—243 X |
| 2,991,199 | 7/1961 | Park et al. | 117—138.8 |
| 3,146,883 | 9/1941 | Harlan et al. | 117—138.8 |
| 3,117,903 | 1/1964 | Hix | 156—308 X |

OTHER REFERENCES

Lange: Handbook of Chemistry, Handbook Publishers, Inc., Sandusky, Ohio, 1944 (pp. 578, 579, 608, 609, relied on).

WILLIAM D. MARTIN, *Primary Examiner.*

R. HUSACK, *Assistant Examiner.*

UNITED STATES PATENT OFFICE
CERTIFICATE OF CORRECTION

Patent No. 3,393,081                      July 16, 1968

Lewis F. Bogle

It is certified that error appears in the above identified patent and that said Letters Patent are hereby corrected as shown below:

Column 3, line 15, "0.1" should read -- 0.01 --. Column 8, line 54 "9/1941" should read -- 9/1964 --.

Signed and sealed this 16th day of December 1969.

(SEAL)
Attest:

Edward M. Fletcher, Jr.                      WILLIAM E. SCHUYLER, JR.
Attesting Officer                              Commissioner of Patents